United States Patent

[11] 3,562,480

[72] Inventor  Alvin Korba
              Aiken, S.C.
[21] Appl No. 844,821
[22] Filed    July 25, 1969
[45] Patented Feb. 9, 1971
[73] Assignee the United States of America as represented by the United States Atomic Energy Commission

[54] THERMOLUMINESCENT DOSIMETER BADGE
     6 Claims, 1 Drawing Fig.
[52] U.S. Cl. .................................................. 250/83.1, 250/71.5
[51] Int. Cl. .................................................. G01t 3/00
[50] Field of Search .......................................... 250/71.5, 83.1

[56]           References Cited
           UNITED STATES PATENTS
2,938,121  5/1960  Fitzgerald et al. ............  250/83.1
3,420,999  1/1969  Distenfeld ....................  250/83.1

Primary Examiner—William F. Lindquist
Assistant Examiner—Davis L. Willis
Attorney—Roland A. Anderson ABSTRACT: A personnel dosimeter for detecting neutron radiation over a wide range of energies including two hemispheres of hydrogenous material with a 6LiF phosphor and a 7LiF phosphor imbedded in each hemisphere. One hemisphere having all of its surfaces covered with cadmium while the other hemisphere having only its curved surface covered with cadmium. Each 6LiF, 7LiF set of phosphors in each hemisphere measures different spectra of incident and body reflected neutrons. The difference in these measurements is correlatable to neutron dose over a wide range of neutron energies.

PATENTED FEB 9 1971
3,562,480
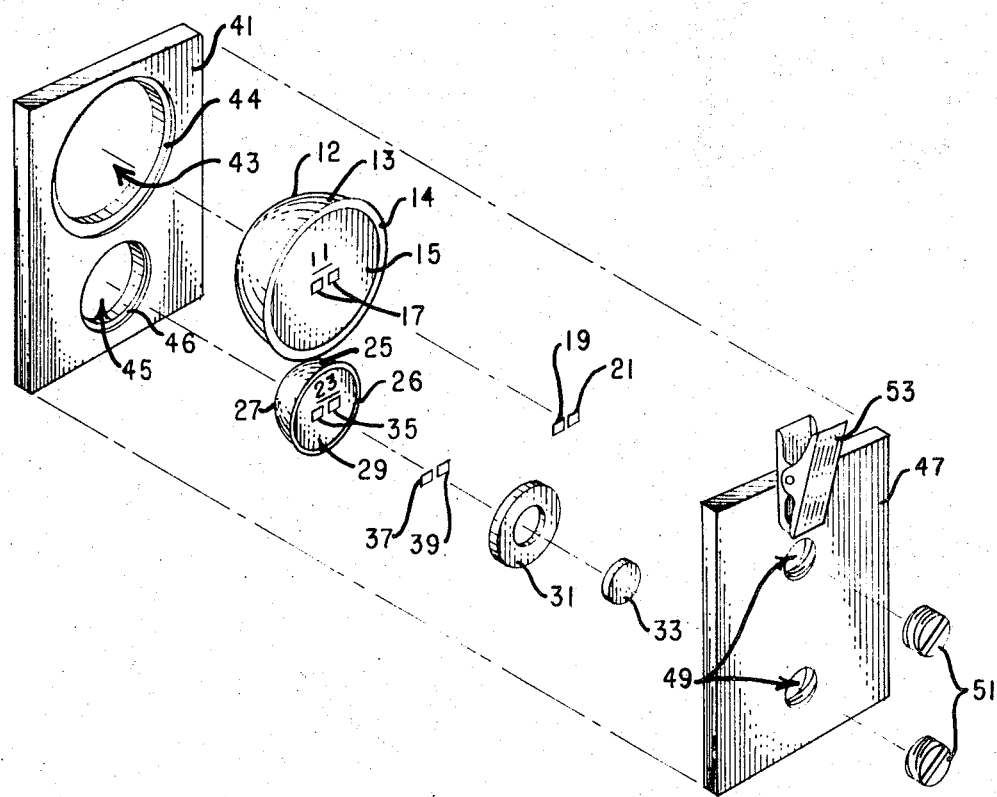
INVENTOR.
Alvin Korba
BY
Attorney:

3,562,480

THERMOLUMINESCENT DOSIMETER BADGE

BACKGROUND OF INVENTION

The invention described herein was made in the course of or under a contract with the U.S. Atomic Energy Commission.

1. Field of the Invention

The present invention relates to a personnel dosimeter for estimating neutron radiation dose sustained by a person exposed to a mixed field of radiation which may include neutron, gamma, beta and alpha radiation of various energies. It is particularly useful for estimating dose incurred by a person exposed to neutron radiation having a wide range of neutron energies with a substantial portion below 1 Mev. such as is produced by $^{252}$Cf, $^{244}$CmO$_2$, and $^{239}$PuF.

2. Description of the Prior Art

Personnel film badges have been used for neutron dosimetry in the past, but are not dependable for accurate readings when the neutron energy spectrum covers a broad range. Ordinarily, a nuclear emulsion film is used to indicate proton recoil from neutron radiation. This type film tends to underestimate dose when a substantial portion of the neutron radiation to be detected is below the 1 Mev. energy level. Such neutron energy spectra are often encountered in the processing of radioactive materials such as $^{239}$Pu, $^{244}$Cm and $^{252}$Cf. For example, neutron radiation produced by the ($\alpha$,n) reaction occurring in $^{239}$PuF is for the most part below 1 Mev. and about one-fourth of the radiation produced by ($\alpha$,n) reactions in CmO$_2$ and the spontaneous fission of $^{252}$Cf are below 1 Mev.

Thermoluminescent phosphors have also been used for personnel dosimetry. These phosphors can be used in very small quantities for determining a broad range of dose. One mineral often used as a thermoluminescent phosphor is lithium fluoride. 6LiF phosphors are sensitive to gamma radiation and thermal neutrons while 7LiF phosphors are principally sensitive to gamma radiation. By using both types of LiF phosphors, the dose contribution from thermal neutrons can be separately determined even when gamma radiation is present. Thermal neutrons contribute little to biological dose when compared to the dose produced by neutrons of higher energy. However, a 6Lif phosphor is very sensitive to thermal neutrons and will overestimate dose if thermal neutrons are detected and no correction is applied. Neither 6LiF or 7LiF phosphors accurately detect fast neutrons. Fast neutron radiation can be thermalized by placing the phosphors in the center of a large sphere of moderating material. Spheres of 25 centimeters or more in diameter are often required for this purpose, but are too large to be conveniently included in a badge size dosimeter to be worn by a person or other subject. For purposes of this application, the term person shall include not only human beings, but also animals which might be exposed to a mixed field of radiation.

SUMMARY OF INVENTION

It is therefore an object of the present invention to provide a badge size personnel dosimeter for measuring neutron radiation dose.

It is also an object to provide a personnel dosimeter for measuring dose produced by neutron radiation over a wide energy spectrum.

It is a further object to provide a personnel dosimeter which will give a weighted estimate of dose sustained from neutrons of varying energies.

In accordance with the present invention a first hemisphere of hydrogenous material is provided with both a 6LiF and a 7LiF thermoluminescent phosphor, and with a cadmium covering over its curved surface. A second hemisphere of hydrogenous material similarly contains a 6LiF and a 7LiF phosphor and is completely covered with a cadmium layer. The two hemispheres are mounted in a badge size structure and an attachment device is provided for securing the hemispheres to a person.

DRAWINGS

The present invention is illustrated in the accompanying FIGURE which is an exploded view of a thermoluminescent dosimeter badge.

DETAILED DESCRIPTION OF PREFERRED EMBODIMENT

Referring now to the FIGURE, a first hemisphere 11 of solid hydrogenous material such as polyethylene is covered with a layer 13 of thermal neutron shielding material over its curved surface 12. A one millimeter thick layer of cadmium has been found to be a suitable thermal neutron shield. The base surface 15 of hemisphere 11 is left exposed without a thermal neutron shield. At least two suitably shaped and sized depressions or cavities 17 are formed into hemisphere 11 near to or at the center of base surface 15 for firmly supporting thermoluminescent phosphors. A first neutron sensitive 6LiF phosphor 19 and a first 7LiF phosphor 21 are separately disposed within cavities 17 in a laterally spaced relationship to serve as radiation detectors. The phosphors are preferably thin ribbon or wafer shaped with a thickness of no more than about one millimeter to minimize absorption of neutrons by the phosphors. A flat surface of each LiF wafer is aligned generally parallel to base surface 15.

A second hemisphere 23 of hydrogenous material is located adjacent to the first hemisphere so that the axes of symmetry of the two hemispheres are generally parallel. Hemisphere 23 is preferably of smaller size than hemisphere 11. For example, hemisphere 11 may be about 5 centimeters while hemisphere 23 may be about 2.5 centimeters in diameter. The curved surface 27 of the second hemisphere is also covered with a layer 25 of thermal neutron shielding material such as cadmium. Base surface 29 is covered with a removable washer 31 and disc 33, both prepared of suitable thermal neutron shielding material. Depressions or cavities 35 for thermoluminescent phosphors are formed near or at the center of base surface 29 in a laterally spaced relationship. A second 6LiF phosphor 37 and a second 7LiF phosphor 39, shaped similar to phosphors 19 and 21, are placed within cavities 35 and covered by removable washer 31 and disc 33. Disc 33 can be removed to expose cavities 35 when phosphor replacement is necessary. Cavities 35 and 17 are sized to firmly support the phosphors in position.

The curved surfaces 12 and 27 of both hemispheres are aligned to project in a generally common direction. A front plate member 41 composed of hydrogenous material such as polyethylene, is provided with a first opening 43 sized to receive and firmly support first hemisphere 11 and a second opening 45 sized to support second hemisphere 23. Openings 43 and 45 each are provided with a recessed surface 44 and 46. Cadmium coverings 13 and 25 include outward flares or flanges 14 and 26 respectively to mate with recessed surfaces 44 and 46. When assembled, base surfaces 15 and 29 are flush with or depressed below the back surface of front plate 41.

A back plate 47 is suitably attached or held with an adhesive paste over the back surface of front plate 41 and the base surfaces 15 and 29 of hemispheres 11 and 23. Two threaded openings 49 within back plate 47 are coaxially aligned with the centers of base surfaces 15 and 29 for replacing the LiF phosphors. Plug members 51 are threaded into openings 49 to prevent loss of the phosphors during use of the dosimeter. A clamp or snap 53 is provided on the back surface of plate 47 to attach the thermoluminescent dosimeter to a person's clothing.

The 6LiF and 7LiF phosphor sets disposed in each hemisphere are employed to detect thermal neutrons even when other types of radiation are present. Generally speaking the 6LiF phosphor will sense gamma photons and thermal neutrons while 7LiF phosphors will only detect gamma photons. Most beta or alpha radiation will be blocked by the cadmium or hydrogenous material and will not reach the phosphors. By subtracting the 7LiF reading from the 6LiF reading an estimate of the thermal neutron radiation reaching the phosphors can be obtained. Fast neutrons generally are not accurately detected with LiF phosphors, but it is assumed that any effect caused by fast neutrons will be canceled by subtracting one LiF phosphor reading from the other.

The phosphors are read in a thermoluminescent reader constructed according to principles well known to those skilled in the art. Thermoluminescent readers are discussed in detail in Cameron et al., Thermoluminescent Dosimetry 75 —100, published by The University of Wisconsin Press, 1968. After use in the dosimeter badge, the individual phosphors are removed and heated in the reader. The phosphors will emit light at an intensity and for an interval of time correlatable to the amount of radiation sensed by the phosphor. A photoelectric device or photomultiplier tube within the reader detects the illumination and transmits an electrical response to a suitable readout device.

The cadmium covering over the curved surfaces of each hemisphere block incident thermal neutrons which generally contribute only a small fraction to the total biological dose. Intermediate and fast incident neutrons penetrate through the cadmium shield into the neutron moderating material within the hemispheres. Some of the penetrating neutrons are moderated to thermal neutrons and will register in the LiF phosphors. Other incident neutrons, especially those having high energy will escape from the dosimeter without detection. If hemisphere 23 is smaller than hemisphere 11, it will moderate a smaller and lower energy fraction of the incident neutrons to thermal energies than will be done by the larger hemisphere. The phosphors in the smaller hemisphere will accordingly detect this lower energy fraction of incident neutrons. The reading from the phosphors in the smaller hemisphere is then used to decrease the weight given low energy neutrons in the dose determination.

Neutron radiation entering the body of the wearer is either absorbed, moderated to lower energies, back scattered, or forward scattered. Generally, the higher energy neutrons are forward scattered while the lower energy neutrons are back scattered. When a high energy neutron has been moderated, or thermalized, the possibility of it being back scattered is increased. Thus a substantial fraction of the back scattered neutrons radiating from the body will generally be of low or even thermal energies.

Since base surface 15 of hemisphere 11 is exposed to the wearer's body, a large proportion of these back scattered neutrons impinging on base surface 15 will be admitted into the neutron moderating material and be detected by phosphors 19 and 21. Base surface 29 of hemisphere 23 is covered with cadmium washer 31 and disc 33 to exclude a large fraction of back scattered neutrons from entering this hemisphere. Therefore, the phosphors in hemisphere 23 will for the most part detect incident neutrons with sufficient energy to penetrate cadmium shield 25 but of insufficient energy to completely pass through the moderator material in this hemisphere.

It has been found that the biological radiation dose attributable to neutron radiation in the energy range of thermal to an excess of 4.5 Mev. neutrons can be estimated by subtracting the thermal neutron reading (the 7LiF reading subtracted from the 6LiF reading) of hemisphere 23 from the comparable reading of hemisphere 11. It is reasonable to assume that biological dose is correlatable to back scattered neutrons entering the person from the side opposite that on which the dosimeter is worn. These neutrons have interacted with the tissues of the person wearing the badge. Furthermore, due to limited penetration of low and thermal energy neutrons into the person, both their biological dose contribution and chance of being back scattered to the dosimeter badge is low. Incident thermal and some epithermal neutron are blocked by the cadmium shields over the curved surfaces of the hemispheres to prevent too great a weight being given them in determining dose. Incident low energy and epithermal neutrons (epicadmium neutrons) which pass through the cadmium shield and are detected by the phosphors are given less weight in the dose determination by subtracting the reading of hemisphere 23 from hemisphere 11. The weight given the neutrons in this energy range may be adjusted by providing the hemisphere 23 with a smaller diameter than hemisphere 11. Of course, back scattered neutrons of epicadmium energies are detected by the small hemisphere and are removed from the dose determination. It is assumed that these neutrons are not so numerous or have not contributed sufficient biological dose to make the biological dose estimate misleading.

The dosimeter reading, that is the reading from hemisphere 11 less the reading from hemisphere 23, is compared with the readings of a standard neutron detector such as one available under the trademark Nemo, Model No. 9140, from the Texas Nuclear Corporation in Austin, Texas. The Nemo neutron detector used as a standard included a single polyethylene sphere of about 25 centimeters in diameter and a LiI scintillator at the spheres center. Neutron detectors of this type are described in Neutron Dosimetry Vol. II, pp. 123 —139 (IAEA, Vienna, 1963. ). An empirical factor is then determined to convert the reading of the thermoluminescent dosimeter to correspond to that of the Nemo or other standard neutron radiation detector.

The thermoluminescent dosimeter (TLD) of the present invention was tested in different neutron spectra and the results compared with similar results obtained from a badge containing a commonly used nuclear emulsion film and with a Nemo neutron detector having a 25 -centimeter polyethylene sphere. The thermoluminescent dosimeter was provided with LiF phosphors purchased under the trade designation TLD-600 and TLD-700, available from the Harshaw Chemical Company in Cleveland, Ohio. The phosphors had flat surfaces of about 10 square millimeters and thicknesses of about 1 millimeter. Two polyethylene hemispheres of about 5 centimeters and 2.5 centimeters diameter were employed in the thermoluminescent dosimeter to support the LiF phosphors as described above.

Both the TLD of the present invention and the film badge dosimeter were mounted on a water filled phantom to simulate a person wearing the badges. The radiation source was placed in front of the badges and the phantom such that the radiation struck the badges before entering the phantom. A $^{239}$Pu-Be source was used with varying thicknesses of moderating material (deuterium oxide) disposed between the source and the badge dosimeters. Also an unmoderated PuF$_4$ neutron source was employed. A further test was performed by placing the phantom with its badge dosimeters and the Nemodetector in a plutonium finishing area where neutron radiation is primarily produced by the presence of PuF$_4$. The results were as shown in the following table:

TABLE

| Source | Approximate average neutron energy | Moderation, mm. D$_2$O | Dose, mrem. | | |
|---|---|---|---|---|---|
| | | | Nemo | TLD | Film |
| $^{239}$Pu-Be | Below 2 mev | 330 | 64 | 64 | 35 |
| | | | | 66 | 20 |
| | | | 262 | 265 | |
| | | | | 262 | |
| | | | 66 | 71 | |
| | | | | 67 | |
| | | | 260 | 264 | |
| $^{239}$Pu-Be | 2 mev | 150 | | 275 | |
| | | | 75 | 90 | 24 |
| | | | | 95 | 45 |
| | | | | 74 | |
| | | | | 69 | |
| $^{239}$Pu-Be | 4.5 mev | 0 | 72 | 70 | 70 |
| | | | | 76 | 62 |
| | | | | 72 | |
| | | | | 70 | |
| | | | | 68 | |
| | | | 180 | 191 | |
| | | | | 162 | |
| $^{239}$PuF$_4$ | 800 kev | 0 | 176 | 165 | 100 |
| | | | | 146 | 95 |
| | | | | 151 | |
| | | | | 154 | |

TABLE—Continued

| Source | Approximate average neutron energy | Moderation. mm. D₂O | Dose, mrem. | | |
|---|---|---|---|---|---|
| | | | Nemo | TLD | Film |
| Pu finishing | | | 80 | 89 | 31 |
| | | | | 90 | 26 |
| | | | | | 14 |
| | | | | | 19 |
| | | | | | 19 |
| | | | | | 14 |

The results show that the thermoluminescent dosimeter of the present invention provides a good estimate of neutron dose over a wide range of neutron energies. This dosimeter has an uncomplicated structure and is easy to disassemble for removing and reading the thermoluminescent phosphors. It is furthermore lightweight and not an inconvenience to the wearer.

I claim:

1. A personnel dosimeter for measuring neutron dose over a wide neutron energy spectrum comprising:
   a. A first hemisphere of solid hydrogenous material for thermolizing fast neutrons having a base surface and a curved surface, said hemisphere including:
      1. a cadmium layer over said curved surface for absorbing thermal neutrons; and
      2. a 6LiF thermoluminescent phosphor for detecting gamma rays and thermal neutrons and a 7Lif thermoluminescent phosphor for detecting gamma radiation disposed adjacent to said base surface;
   b. a second hemisphere of solid hydrogenous material for thermalizing fast neutrons having a base surface and a curved surface, said second hemisphere disposed adjacent to said first hemisphere and having:
      1. a cadmium layer over the base and curved surfaces thereof for absorbing thermal neutrons; and
      2. a 6LiF thermoluminescent phosphor for detecting gamma rays and thermal neutrons and a 7LiF thermoluminescent phosphor for detecting gamma radiation disposed adjacent to said base surface; and
   c. structural means for maintaining the base surfaces of both hemispheres adjacent to a person so that the curved surfaces of both hemispheres project outwardly from said person.

2. The personnel dosimeter of claim 1 wherein said second hemisphere is of smaller diameter than said first hemisphere.

3. The dosimeter of claim 2 wherein said first hemisphere has a diameter of about 5 centimeters and said second hemisphere has a diameter of about 2.5 centimeters.

4. The dosimeter of claim 1 wherein said thermoluminescent phosphors are thin wall wafer shaped and have flat surfaces disposed generally parallel to the base surfaces of said hemispheres.

5. The dosimeter of claim 1 wherein said hemispheres are composed of polyethylene.

6. The dosimeter of claim 1 wherein the spectrum of neutron energy measurement is from thermal to about 1 Me.